United States Patent
Cook

(10) Patent No.: US 8,060,479 B1
(45) Date of Patent: Nov. 15, 2011

(54) SYSTEMS AND METHODS FOR TRANSPARENTLY RESTORING DATA USING FILE STREAMING

(75) Inventor: Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 570 days.

(21) Appl. No.: 12/058,036

(22) Filed: Mar. 28, 2008

(51) Int. Cl.
*G06F 17/00* (2006.01)
*G06F 11/16* (2006.01)

(52) U.S. Cl. .......................................... 707/679; 714/20

(58) Field of Classification Search .................. None
See application file for complete search history.

(56) References Cited

U.S. PATENT DOCUMENTS

| | | | |
|---|---|---|---|
| 5,799,147 A | 8/1998 | Shannon | |
| 7,254,682 B1 | 8/2007 | Arbon | |
| 7,676,509 B2 * | 3/2010 | Swanepoel et al. | 711/162 |
| 2001/0044807 A1 | 11/2001 | Kleiman et al. | |
| 2002/0042833 A1 | 4/2002 | Hendler et al. | |
| 2004/0261091 A1 | 12/2004 | Cherkasova et al. | |
| 2008/0115141 A1 * | 5/2008 | Welingkar et al. | 718/104 |
| 2009/0249005 A1 * | 10/2009 | Bender et al. | 711/162 |

* cited by examiner

*Primary Examiner* — Tarek Chbouki
(74) *Attorney, Agent, or Firm* — Advantedge Law Group

(57) ABSTRACT

A computer-implemented method for transparently restoring data using streaming may comprise identifying an attempt to access backed-up data that is not present on a computing device, transmitting a request to a server to restore the backed-up data, receiving the backed-up data from the server via streaming, and restoring the backed-up data to the computing device. A corresponding method for streaming backed-up data to a target computing device is also disclosed. In addition, corresponding systems and computer-readable media are also disclosed.

13 Claims, 7 Drawing Sheets

SYSTEMS AND METHODS FOR TRANSPARENTLY RESTORING DATA USING FILE STREAMING

BACKGROUND

Conventional methods for restoring data to a target computing system typically involve copying large amounts of data to the target computing system. Unfortunately, this data may be restored to the target computing system without regard to the actual needs of the target computing system. For example, a target computing system may rarely, if ever, use or access a majority of the data restored to the target computing system during a restore operation. This may result in an inefficient use of computing and/or network resources during the restore operation.

Moreover, a user of a target computing device may be unable to use or access any portion of the restored data until the entire restore operation is complete (i.e., until the entire amount of data has been restored to the target computing system). Accordingly, there exists a need for systems and methods for more quickly and efficiently restoring data to target computing systems.

SUMMARY

As will be described in greater detail below, the instant disclosure generally relates to systems and methods for quickly and efficiently restoring data to a computing system using file streaming in a manner that is transparent to a user of the computing system. For example, a method for transparently restoring data to a computing system using file streaming may comprise: 1) identifying an attempt (such as an attempt by a user) to access backed-up data that is not present on a computing device, 2) transmitting a request to a server to restore the backed-up data, 3) receiving the backed-up data from the server via file streaming, and 4) restoring the backed-up data to the computing device.

In one example, the backed-up data may be requested and received from the server on an as-needed basis (such as when requested by a user). In an additional example, after an initial attempt (such as an attempt by a user) to access a first portion of the backed-up data is identified, additional portions of the backed-up data may be requested and/or received from the server in the background via streaming. For example, a first portion of a file backed up on a server may be streamed to a target computing device in response to an attempt by a user to access the first portion of the file. Upon streaming the first portion of the file to the target computing device, a second portion (or the remainder) of the file may be streamed to the target computing device, even if a user has not yet attempted to access this second portion.

The backed-up data stored on the server may represent file-based data, sector-based data, or any other form of data. For example, the backed-up data may represent an image or snapshot of a computing device, a file (such as a database file or a registry file), data that is essential to booting a target computing system, data that is not essential to booting the target computing system, or any other type or form of data.

In an additional embodiment, the method may also comprise removing the backed-up data from the computing device if an additional attempt to access the backed-up data is not identified within a predetermined period of time (such as six months or a year) after the backed-up data has been restored. This additional step may increase the storage capacity of the computing system by eliminating the need to retain copies of data that is rarely (if ever) accessed.

As detailed above, systems and methods for streaming backed-up data to a target computing device are also disclosed. For example, a method for streaming backed-up data to a target computing device may comprise: 1) receiving a request from a target computing device to restore backed-up data, 2) locating the backed-up data, and 3) streaming the backed-up data to the target computing device. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
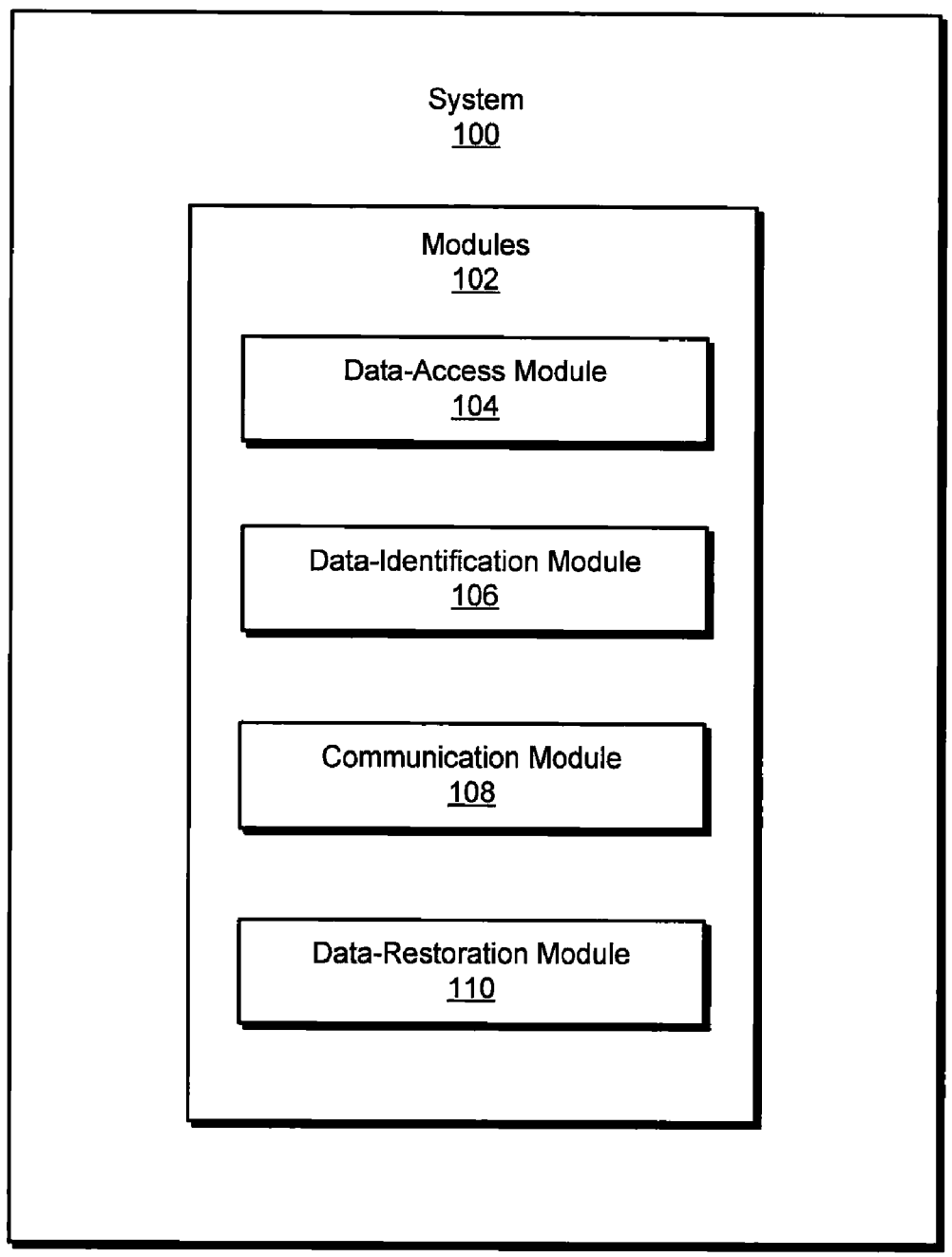
FIG. 1 is a block diagram of an exemplary system for transparently restoring data using file streaming according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for quickly and efficiently restoring data to a computing system using file streaming in a manner that is transparent to a user of the computing system. Systems and methods for streaming backed-up data to a target computing device are also disclosed. The phrase "backed-up data," as used herein, may refer to copies of data stored on an additional computing system, such as a server or backend.

Figure 2:
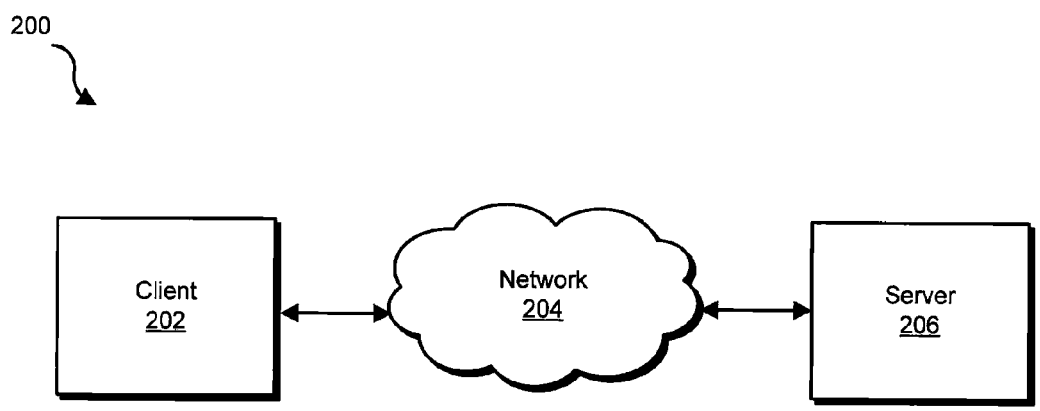
FIG. 2 is a block diagram of an exemplary network-based system for transparently restoring data using file streaming according to at least one embodiment.

The following will provide, with reference to FIGS. 1 and 2, detailed descriptions of exemplary systems for transparently restoring data using streaming and/or streaming backed-up data to a target computing device. A description of an exemplary region of data on a computing system that has been backed up to a server will be provided in connection with FIG. 4. Detailed descriptions of corresponding exemplary computer-implemented methods will also be provided in connection with FIGS. 3 and 5.

FIG. 1 is a block diagram of an exemplary system 100 for transparently restoring data using streaming and/or for streaming backed-up data to a target computing device. As illustrated in this figure, exemplary system 100 may comprise one or more modules 102 for performing one or more tasks. For example, as will be described in greater detail below, exemplary system 100 may comprise a data-access module 104 for identifying an attempt to access backed-up data that is not present on a computing device.

Exemplary system 100 may also comprise a data-identification module 106 for identifying backed-up data that is related to backed-up data identified by data-access module 104. In addition, exemplary system 100 may comprise a communication module 108 for facilitating communication between a computing system (such as a user's system) and a server or backend. Exemplary system 100 may also comprise a data-restoration module 110 for restoring data to a computing system. Although illustrated as separate modules, one or more of modules 102 in FIG. 1 may represent portions of a single module.

In certain embodiments, one or more of modules 102 may represent one or more software applications or programs that, when executed by a computing device, may cause the computing device to transparently restore data using streaming and/or stream backed-up data to a target computing device. For example, as will be described in greater detail below, one or more of modules 102 may represent software modules configured to run on one or more computing devices, such as exemplary computing system 610 in FIG. 6 and/or portions of exemplary network architecture 700 in FIG. 7. One or more of modules 102 may also represent all or portions of one or more special-purpose computers configured to perform one or more tasks required to transparently restore data using streaming and/or stream backed-up data to a target computing device.

Exemplary system 100 in FIG. 1 may be deployed in a variety of ways. For example, all or a portion of exemplary system 100 may represent portions of a network-based system. FIG. 2 is an illustration of an exemplary network-based system 200 for transparently restoring data using streaming and/or for streaming backed-up data to a target computing device. As illustrated in this figure, exemplary system 200 may comprise a client 202 in communication with a server 206 via a network 204.

Client 202 generally represents any type or form of client-side computing device, such as a user's computing device, capable of executing computer-readable instructions. In certain embodiments, client 202 may comprise one or more portions of exemplary system 100 in FIG. 1. For example, one or more of modules 102 in FIG. 1 may be stored and configured to run on client 202.

In at least one embodiment, client 202 may communicate with server 206 via network 204. Network 204 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 206. Server 206 generally represents any type or form of server-side computing device, such as a backend. In certain embodiments, server 206 may comprise one or more portions of exemplary system 100 in FIG. 1. For example, one or more of modules 102 from FIG. 1 may be stored and configured to run on server 206.

Figure 3:
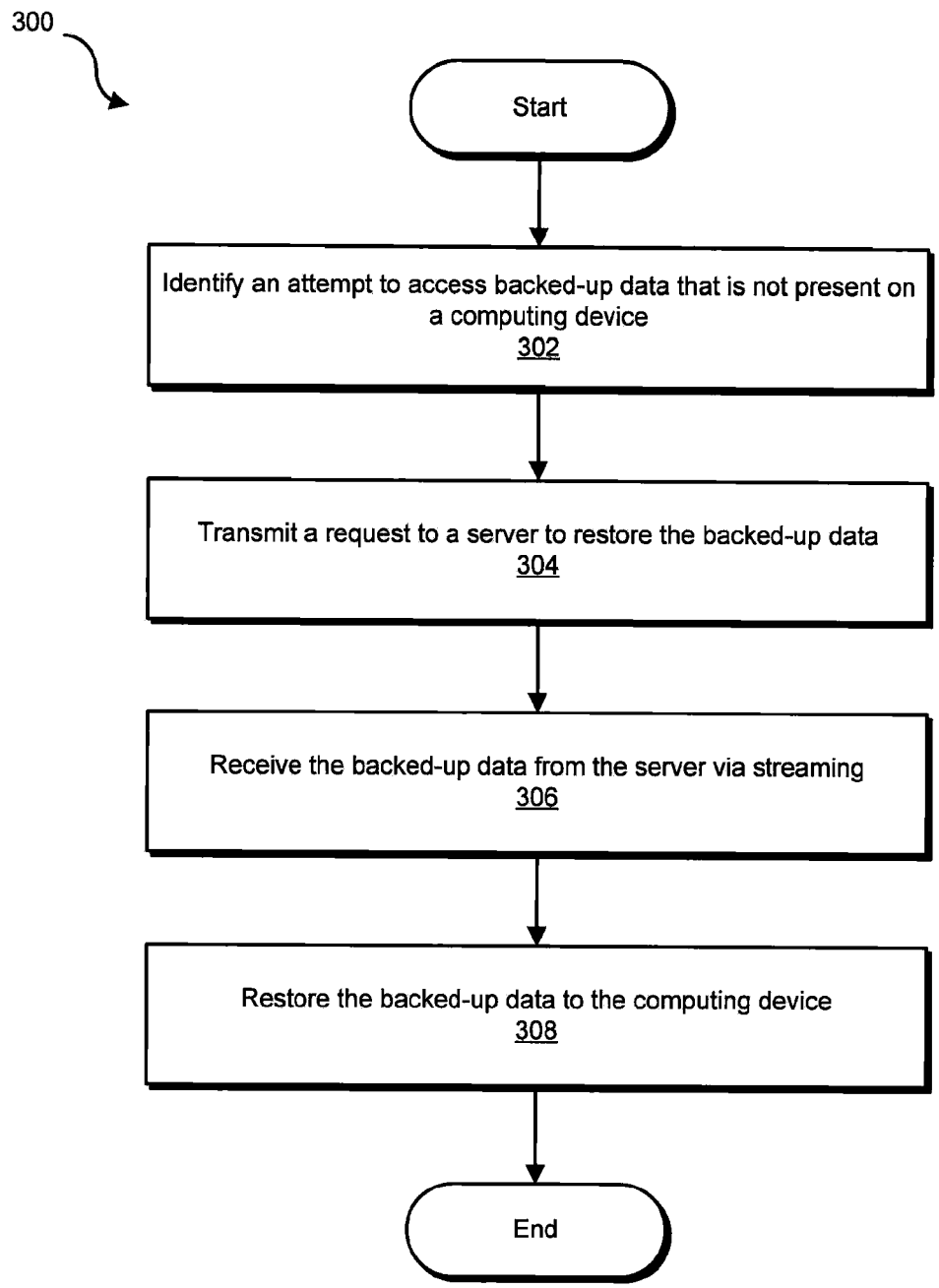
FIG. 3 is a flow diagram of an exemplary computer-implemented method for transparently restoring data using file streaming according to at least one embodiment.

FIG. 3 is a flow diagram of an exemplary computer-implemented method 300 for transparently restoring data using streaming. As illustrated in this figure, at step 302 an attempt to access backed-up data that is not present on a computing device may be identified. For example, data-access module 104 in FIG. 1 may identify an attempt by client 202 in FIG. 2 to access a region of data on client 202 that has been backed up to server 206 and which is not present on client 202.

Figure 4:
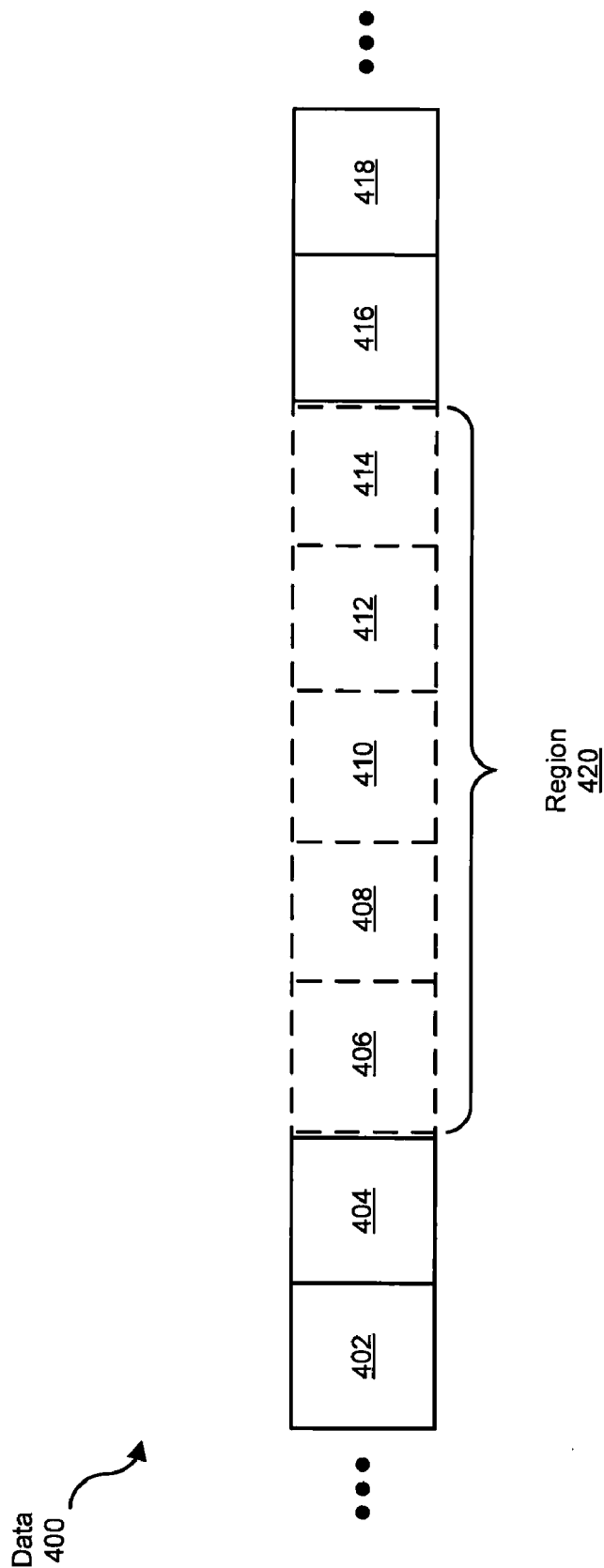
FIG. 4 is a block diagram of an exemplary region of data on a computing system that has been backed up to a server.

FIG. 4 is a block diagram of an exemplary region 420 of data 400 on a computing system that has been backed up to a server. Data 400 may represent any type or form of data structure on a computing system, including file-based data or sector-based data. Examples of data 400 include, without limitation, a file, a folder, a partial or full image or snapshot of a computing system, or any other suitable data structure.

In at least one embodiment, data 400 may comprise a plurality of data blocks 402, 404, 416, and 418 containing data. In certain embodiments, a region 420 (comprising data-block locations 406-414) of data 400 may be backed up on a server, such as server 206 in FIG. 2. In this example, data corresponding to data-block locations 406-414 in region 420 may not be present within region 420 of data 400. Instead, as detailed above, the data corresponding to data-block locations 406-414 in region 420 may be stored or backed up on a server, such as server 206 in FIG. 2.

Returning to FIG. 3, an attempt to access backed-up data that is not present on a computing device may be identified in step 302 in a variety of ways. For example, data-access module 104 in FIG. 1 may identify an attempt to access region 420 of data 400 in FIG. 4. As detailed above, in certain embodiments data corresponding to data-block locations 406-414 in region 420 may be stored or backed up on a server and may not be present on the computing device.

As with the rest of data 400, region 420 may correspond to any type or form of data structure, including, for example, a file, a folder, an image, or a snapshot of a computing device. Accordingly, identifying an attempt to access region 420 of data 400 in FIG. 4 may comprise identifying an attempt (such as an attempt by a user) to access all or a portion of a file, an image, or a snapshot that has been stored on or backed up to a server, such as server 206 in FIG. 2.

Returning to FIG. 3, at step 304 a request to restore the backed-up data identified in step 302 may be transmitted to a server. Step 304 may be performed in a variety of ways. For example, communication module 108 in FIG. 1 may cause client 202 in FIG. 2 to transmit a request to server 206 to restore region 420 of data 400 in FIG. 4 to client 202.

Returning to FIG. 3, at step 306 the backed-up data requested in step 304 may be received from the server via streaming. For example, client 202 in FIG. 2 may receive the backed-up data requested in step 304 from server 306 via a streaming protocol. The term "streaming," as used herein, may refer to any type or form of protocol used to stream data. Examples of suitable streaming protocols include, without limitation, TCP, HTCP, or any other suitable streaming protocol.

At step 308, the backed-up data received from the server via streaming may be restored to the computing device. Data may be restored in a variety of ways. For example, in certain embodiments data-restoration module 110 in FIG. 1 may restore the backed-up data received from server 206 in FIG. 2 by copying the data to region 420 of data 400 in FIG. 4 on client 202. Upon completion of step 308 in FIG. 3, exemplary method 300 may terminate.

As detailed above, backed-up data may be requested and received from a server on an as-needed basis (e.g., such as when requested by a user). In additional embodiments, however, exemplary method 300 in FIG. 3 may also comprise, after identifying an initial attempt to access a first portion of backed-up data, requesting and/or receiving additional portions of the backed-up data from the server in the background via streaming. In this example, a first portion of backed-up data stored on a server may be streamed to a target computing device in response to an attempt by a user to access the first portion of the backed-up data. Upon streaming the first portion of the backed-up data to the target computing device, a second portion (or the remainder) of the backed-up data may be streamed to the target computing device, even if a user has not yet attempted to access this second portion.

For example, step 302 in FIG. 3 may comprise identifying an attempt to access data-block location 406 of region 420 in FIG. 4. At step 304, communication module 108 in FIG. 1 may cause client 202 in FIG. 2 to transmit a request to server 206 to restore the data corresponding to data-block location 406. At step 306, communication module 108 on client 202 may receive the data corresponding to data-block location 406 from server 206. At step 308, data-restoration module 110 may restore the data corresponding to data-block location 406 on client 202.

Upon restoring the data corresponding to data-block location 406, data-identification module 106 in FIG. 1 may identify a second portion (or the remainder) of the backed-up data stored on the server. For example, data-identification module 106 in FIG. 1 may identify data-block locations 408-414 in region 420. Communication module 108 in FIG. 1 may then cause client 202 in FIG. 2 to transmit a request to server 206 to restore data corresponding to one or more of data-block locations 408-414, even if a user has not yet attempted to access these data-block locations.

As detailed above, region 420 of data 400 in FIG. 4 may correspond to a file or an image that has been backed up or stored on a server, such as server 206. In this example, requesting and/or receiving additional portions of the backed-up data from the server in the background via streaming may comprise, after restoring a first portion of the file or image: 1) identifying (using, for example, data-identification module 106 in FIG. 1) a second portion (or the remainder) of the file or image, 2) transmitting a request to a server for the second portion (or the remainder) of the file or image, and then 3) receiving the second portion (or the remainder) of the file or image from the server via streaming.

Although not illustrated, in certain embodiments exemplary method 300 in FIG. 3 may also comprise, after restoring the backed-up data to the computing device in step 308, removing the backed-up data from the computing device if an additional attempt to access the backed-up data is not identified within a predetermined period of time. For example, data-access module 104 in FIG. 1 may, after data-restoration module 110 in FIG. 1 restores (in step 308) region 420 of data 400 in FIG. 4, continue to monitor attempts to access region 420. If an attempt to access region 420 is not identified by data-access module 104 within a predetermined period of time (such as six months or a year) after region 420 has been restored, then one or more of modules 102 in FIG. 1 may cause client 202 to remove the data in region 420 from client 202. In at least one embodiment, this additional step may increase the storage capacity of client 202 by eliminating the need to retain copies of data that is rarely (if ever) accessed. If, after the data from region 420 has been removed from client 202, data-access module 104 in FIG. 1 identifies an additional attempt to access region 420, then control may proceed to step 304 of exemplary method 300 in FIG. 3 where a request to restore the data corresponding to region 420 may again be transmitted to the server.

Figure 5:
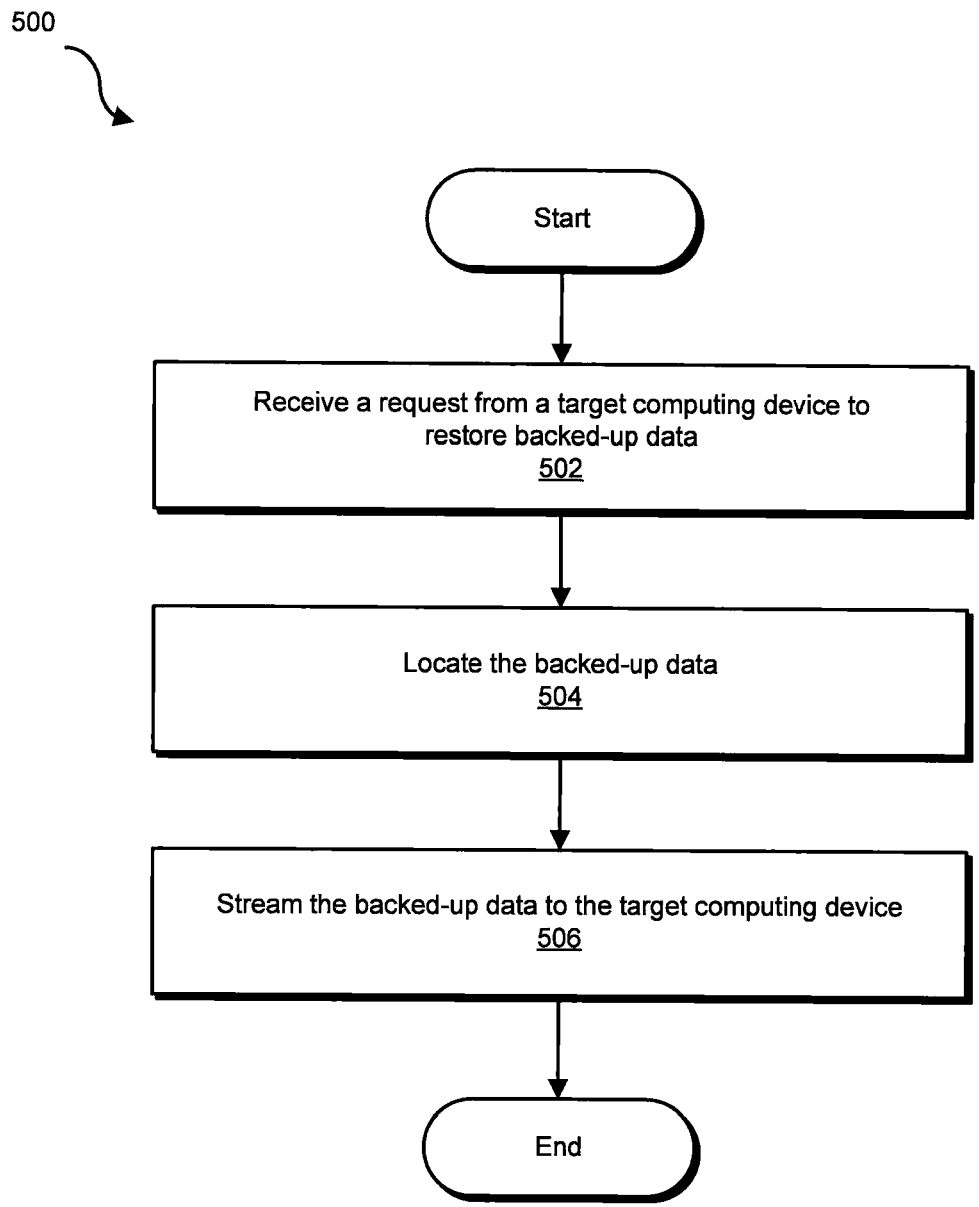
FIG. 5 is a flow diagram of an exemplary computer-implemented method for streaming backed-up data to a target computing device according to at least one embodiment.

As detailed above, the instant disclosure also provides systems and methods for streaming backed-up data to a target computing device. FIG. 5 is a flow diagram of an exemplary computer-implemented method 500 for streaming backed-up data to a target computing device. As illustrated in this figure, at step 502 a request from a target computing device to restore backed-up data may be received. For example, server 206 in FIG. 2 may receive a request from client 202 via network 204 to restore data-block location 406 in region 420 of data 400 in FIG. 4.

As detailed above, the request received in step 502 may comprise a request to restore all or a portion of the backed-up data stored on the server. For example, server 206 in FIG. 2 may receive a request from client 202 to restore all or a portion of a file (such as a database file) backed up on server 206, all or a portion of an image or snapshot backed up on server 206, all or a portion of registry data backed up on server 206, or the like.

At step 504, the backed-up data may be located. For example, server 206 in FIG. 2 may locate data corresponding to one or more of data-block locations 406-414 in region 420 in FIG. 4. At step 506, the backed-up data may be streamed to the target computing device. For example, communication module 108 in FIG. 1 may cause server 206 in FIG. 2 to stream data corresponding to one or more of data-block locations 406-414 in region 420 to client 202. As detailed above, this data may then be restored on client 202. Upon completion of step 506 in FIG. 5, exemplary method 500 may terminate.

As detailed above, the request received from the target computing device in step 502 may contain a request to restore merely a first portion of the backed-up data stored on the server. In this example, step 506 in FIG. 5 may comprise streaming both the first portion of the backed-up data and a second portion of the backed-up data (such as the remainder of the backed-up data). For example, data-identification module 106 in FIG. 1 may cause server 206 in FIG. 2 to, upon receiving a request from client 202 to restore a first portion of backed-up data (such as data corresponding to data-block location 406 of region 420 in FIG. 4), identify data that corresponds to a second portion of the backed-up data that is related to the first portion (such as data corresponding to data-block locations 408-414 of region 420 in FIG. 4). Communication module 108 in FIG. 1 may then cause server 206 to stream both the first portion (e.g., the data corresponding to data-block location 406) and the second portion (e.g., the data corresponding to data-block locations 408-414) to client 202.

Related data may be identified in a variety of ways. For example, when server 206 in FIG. 2 receives a request from client 202 to restore a first portion of a file or an image stored on server 206, data-identification module 106 in FIG. 1 may identify a second portion (or the remainder) of the file or image.

As detailed above, the exemplary systems and methods described herein may enable backed-up data to be more efficiently and quickly restored to a target computing system. For example, in certain embodiments, only backed-up data that is needed or requested by a computing system will be restored to the computing system, thereby potentially reducing the amount of data that must be transmitted from the server over the network. Similarly, the exemplary systems and methods described herein may enable a user to access and use backed-up data without having to wait for an entire image or snapshot to be restored.

Figure 6:
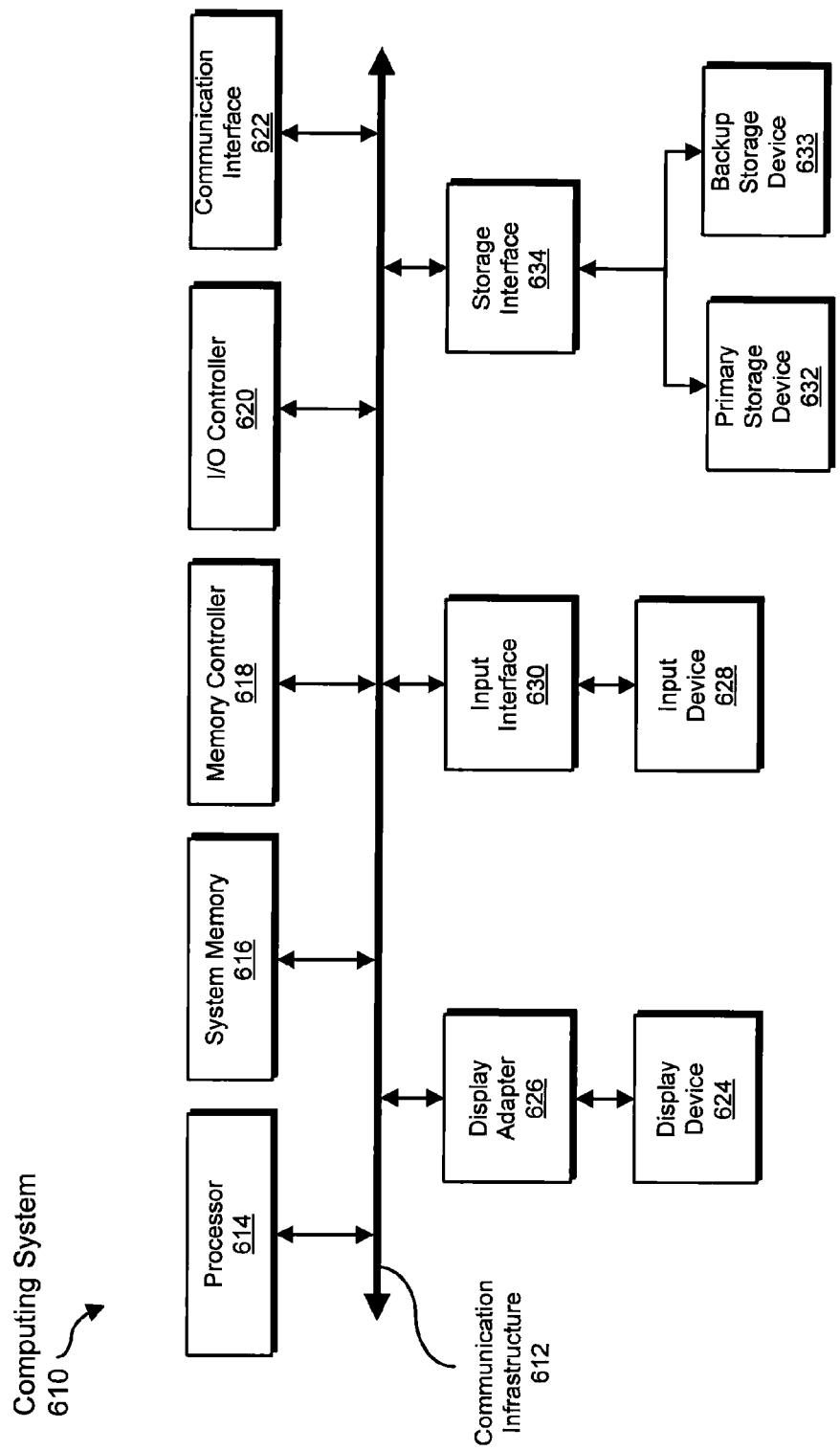
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, transmitting, receiving, restoring, locating, and streaming steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, transmitting, receiving, restoring, locating, and streaming.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for identifying, transmitting, receiving, restoring, locating, and streaming steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, transmitting, receiving, restoring, locating, and streaming steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610.

Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, transmitting, receiving, restoring, locating, and streaming steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, the exemplary file systems disclosed herein may be stored on primary storage device 632, while the exemplary file-system backups disclosed herein may be stored on backup storage device 633. Storage devices 632 and 633 may also be used, for example, to perform and/or be a means for performing, either alone or in combination with other elements, one or more of the identifying, transmitting, receiving, restoring, locating, and streaming steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
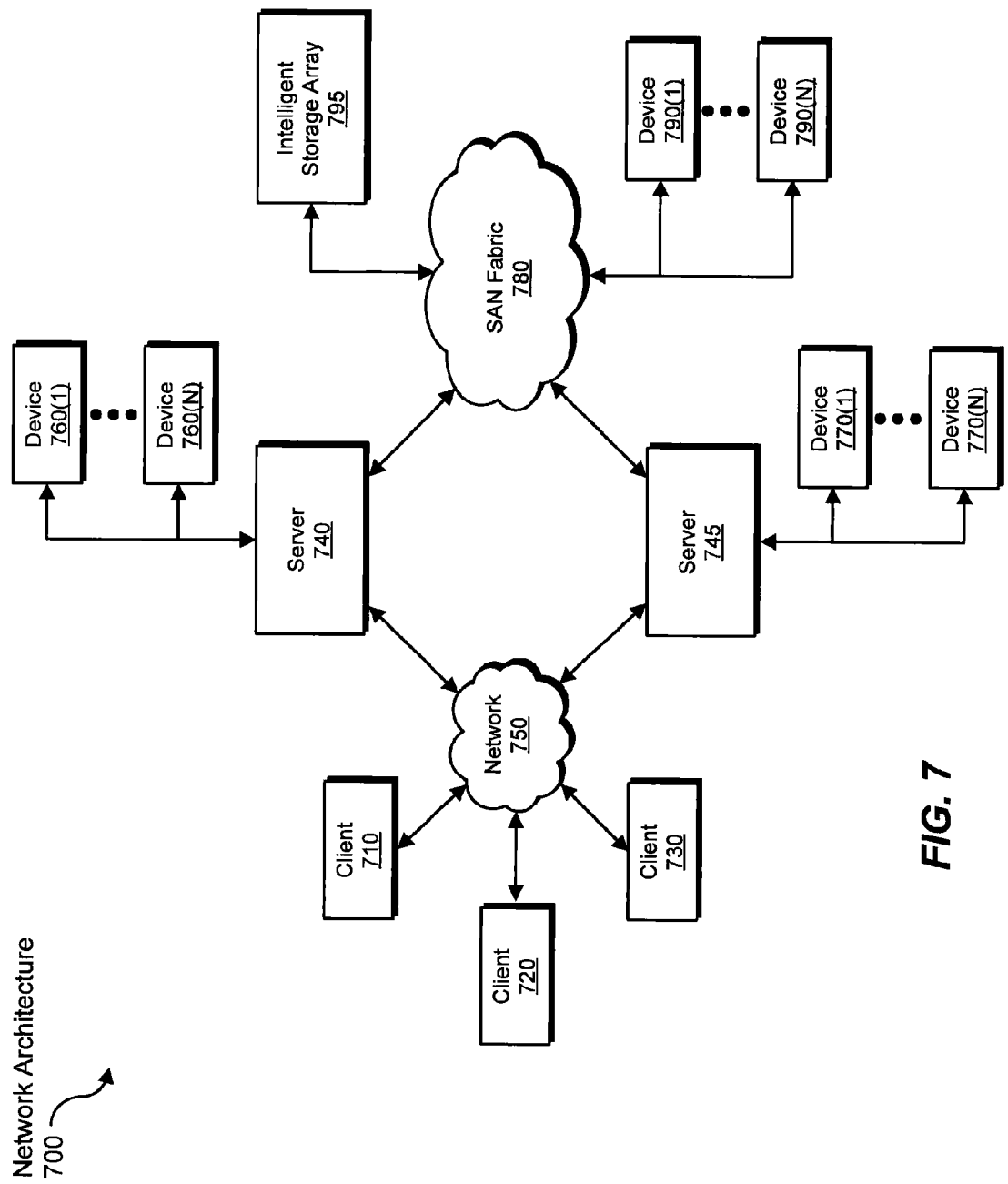
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, transmitting, receiving, restoring, locating, and streaming steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements one or more of the steps of the exemplary methods described and/or illustrated herein. For example, computing system 610 and/or one or more portions of network architecture 700 may perform and/or be a means for performing a computing-implemented method for transparently restoring data using streaming that comprises identifying an attempt to access backed-up data that is not present on a computing device, transmitting a request to a server to restore the backed-up data, receiving the backed-up data from the server via streaming, and restoring the backed-up data to the computing device.

In certain embodiments, identifying the attempt to access the backed-up data may comprise identifying an attempt to access a portion of the backed-up data and/or all of the backed-up data. Similarly, transmitting the request to the server may comprise transmitting a request to restore a portion of the backed-up data and/or all of the backed-up data.

In at least one embodiment, identifying the attempt to access the backed-up data may comprise identifying an attempt to access a first portion of the backed-up data. In this example, transmitting the request to the server may comprise transmitting a request to restore the first portion of the backed-up data, a second portion of the backed-up data that is related to the first portion, and/or the remainder of the backed-up data. Similarly, receiving the backed-up data from the server via streaming may comprise receiving the first portion of the backed-up data, receiving a second portion of the backed-up data that is related to the first portion, and/or receiving the remainder of the backed-up data.

As explained above, the backed-up data may comprise file-based data, sector-based data, data that is essential to booting a computing system, data that is not essential to booting the computing system, an image, a file, or any other type or form of data structure. In certain embodiments, the method may also comprise, after restoring the backed-up data to the computing device, removing the backed-up data from the computing device if a second attempt to access the backed-up data is not identified within a predetermined period of time.

In an additional embodiment, a computer-implemented method for streaming backed-up data to a target computing device may comprise receiving a request from the target computing device to restore backed-up data, locating the backed-up data, and streaming the backed-up data to the target computing device. In certain embodiments, receiving the request from the target computing device may comprise receiving a request to restore a portion of the backed-up data and/or all of the backed-up data. Similarly, streaming the backed-up data to the target computing device may comprise streaming all or a portion of the backed-up data to the target computing device.

In at least one embodiment, receiving the request from the target computing device may comprise receiving a request to restore a first portion of the backed-up data. In this example, locating the backed-up data may comprise locating the first portion of the backed-up data, a second portion of the backed-up data that is related to the first portion, and/or the remainder of the backed-up data. Similarly, streaming the backed-up data to the target computing device in this example may comprise streaming the first portion of the backed-up data to the target computing device, streaming the second portion of the backed-up data to the target computing device, and/or streaming the remainder of the backed-up data to the target computing device.

As detailed above, all or portions of exemplary system 100 in FIG. 1 may represent a software application or program that, when executed by a computing device, may cause the computing device to perform one or more tasks required to transparently restore data using streaming. In this embodiment, all or portions of exemplary system 100 in FIG. 1 may represent computer-readable media comprising one or more computer-executable instructions that, when executed by a computing device, may cause the computing device to identify an attempt to access backed-up data that is not present on the computing device, transmit a request to a server to restore the backed-up data, receive the backed-up data from the server via steaming, and restore the backed-up data to the computing device. The computer-executable instructions may also cause the computing device to remove the backed-up data from the computing device if a second attempt to access the backed-up data is not identified within a predetermined period of time.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for transparently restoring data using file-streaming protocols, at least a portion of the method being performed by a client-side computing device comprising at least one processor, the method comprising:
    identifying an attempt by a user to access a portion of a backed-up file that appears to be present on the client-side computing device but is not present on the client-side computing device;
    transmitting a request to a server to transparently restore the portion of the backed-up file to the client-side computing device;
    receiving only the portion of the backed-up file from the server via a file-streaming protocol;
    transparently restoring the portion of the backed-up file to the client-side computing device such that the portion of the backed-up file appears to have been present on the client-side computing device at the time the user initiated the attempt to access the portion of the backed-up file;
    enabling the client-side computing device to access the portion of the backed-up file prior to restoring the remainder of the backed-up file;
    receiving the remainder of the backed-up file from the server on an as-needed basis:
    wherein receiving the remainder of the backed-up file on an as-needed basis comprises:
    transmitting a request to the server to transparently restore another portion of the backed-up file comprising less than the remainder of the backed-up file;
    receiving the other portion of the backed-up file from the server via the file-streaming protocol;
    transparently restoring the other portion of the backed-up file to the client-side computing device such that the user is unaware that the other portion of the backed-up file is being restored;
    enabling the client-side computing device to access the other portion of the backed-up file prior to restoring the remainder of the backed-up file.

2. The method of claim 1, wherein transmitting the request to the server to transparently restore the other portion of the backed-up file comprises transmitting the request to transparently restore the other portion of the backed-up file prior to identifying an attempt by the user to access the other portion of the backed-up file.

3. The method of claim 1, wherein receiving the remainder of the backed-up file on an as-needed basis further comprises:
    transmitting a request to the server to transparently restore the remainder of the backed-up file prior to identifying an attempt by the user to access the remainder of the backed-up file;
    receiving the remainder of the backed-up file from the server via the file-streaming protocol;
    transparently restoring the remainder of the backed-up file to the client-side computing device such that the user is unaware that the remainder of the backed-up file is being restored.

4. The method of claim 1, wherein receiving the portion of the backed-up file from the server via the file-streaming protocol comprises using the HTCP file-streaming protocol to receive the portion of the backed-up file.

5. The method of claim 1, wherein the portion of the backed-up file comprises a portion of an image.

6. The method of claim 1, further comprising, after restoring the portion of the backed-up file to the client-side computing device, removing the portion of the backed-up file from the client-side computing device if a subsequent attempt to access the portion of the backed-up file is not identified within a predetermined period of time.

7. A computer-implemented method for streaming backed-up data to a client-side computing device, at least a portion of the method being performed by a server-side computing device comprising at least one processor, the method comprising:
    receiving a request from the client-side computing device to restore only a portion of a backed-up file, the request being transmitted by the client-side computing device in response to an attempt by a user to access the portion of the backed-up file on the client-side computing device;
    locating the portion of the backed-up file;
    streaming, using a file-streaming protocol, only the portion of the backed-up file to the client-side computing device in order to transparently restore the portion of the backed-up file to the client-side computing device such that the client-side computing device is able to access the portion of the backed-up file prior to restoring the remainder of the backed-up file to the client-side computing device;
    streaming, using the file-streaming protocol, the remainder of the backed-up file to the client-side computing device on an as-needed basis:
    wherein streaming the remainder of the backed-up file to the client-side computing device on an as-needed basis comprises:
    receiving a request from the client-side computing device to transparently restore another portion of the backed-up file comprising less than the remainder of the backed-up file;
    locating the other portion of the backed-up file;
    streaming, using the file-streaming protocol, the other portion of the backed-up file to the client-side computing device such that the client-side computing device is able to access the other portion of the backed-up file prior to restoring the remainder of the backed-up file to the client-side computing device.

8. The method of claim 7, wherein streaming the remainder of the backed-up file to the client-side computing device on an as-needed basis further comprises:
   receiving a request from the client-side computing device to transparently restore the remainder of the backed-up file;
   locating the remainder of the backed-up file;
   streaming, using the file-streaming protocol, the remainder of the backed-up file to the client-side computing device.

9. The method of claim 7, wherein the portion of the backed-up file comprises a portion of an image.

10. The method of claim 7, wherein the portion of the backed-up file comprises at least one of:
    data that is essential to booting the client-side computing system;
    data that is non-essential to booting the client-side computing system.

11. A non-transitory computer-readable storage medium comprising one or more computer-executable instructions that, when executed by a client-side computing device, cause the client-side computing device to:
    identify an attempt by a user to access a portion of a backed-up file that appears to be present on the client-side computing device but is not present on the client-side computing device;
    transmit a request to a server to transparently restore the portion of the backed-up file to the client-side computing device;
    receive only the portion of the backed-up file from the server via a file-streaming protocol;
    transparently restore the portion of the backed-up file to the client-side computing device such that the portion of the backed-up file appears to have been present on the client-side computing device at the time the user initiated the attempt to access the portion of the backed-up file;
    enable the client-side computing device to access the portion of the backed-up file prior to restoring the remainder of the backed-up file;
    receive the remainder of the backed-up file from the server on an as-needed basis:
    wherein receiving the remainder of the backed-up file from the server on an as-needed basis comprises:
    transmitting a request to the server to transparently restore another portion of the backed-up file comprising less than the remainder of the backed-up file;
    receiving the other portion of the backed-up file from the server via the file-streaming protocol;
    transparently restoring the other portion of the backed-up file to the client-side computing device such that the user is unaware that the other portion of the backed-up file is being restored;
    enabling the client-side computing device to access the portion of the backed-up file prior to restoring the remainder of the backed-up file.

12. The non-transitory computer-readable storage medium of claim 11, further comprising one or more computer-executable instructions that, when executed by the client-side computing device, cause the client-side computing device to transmit the request to transparently restore the other portion of the backed-up file prior to identifying an attempt by the user to access the other portion of the backed-up file.

13. The non-transitory computer-readable storage medium of claim 11, further comprising one or more computer-executable instructions that, when executed by the client-side computing device, cause the client-side computing device to remove the portion of the backed-up file from the client-side computing device if a subsequent attempt to access the portion of backed-up file is not identified within a predetermined period of time.

* * * * *